Patented Mar. 12, 1935

1,993,743

UNITED STATES PATENT OFFICE 1,993,743

PREPARATION OF THE METAL SALTS OF ACETYLSALICYLIC ACID

Clemmy O. Miller, Chicago, Ill.

No Drawing. Application April 15, 1933,
Serial No. 666,327

14 Claims. (Cl. 260—107)

This invention relates to the preparation of metal salts of acetylsalicylic acid, and more particularly to a process whereby these salts are prepared free from salicylates, salicylic acid, and acetylsalicylic acid.

In one embodiment, the present invention is directed particularly to the preparation of calcium acetylsalicylate free from calcium salicylate, salicylic acid, and acetylsalicylic acid. However, the invention is not limited to the production of calcium acetylsalicylate, since, in its broad aspects, the invention embraces the production of all metal salts of acetylsalicylic acid.

Acetylsalicylic acid is widely used as an analgesic and antipyretic in cases of headache, neuralgias, colds, fevers, arthritis, rheumatic fever, et cetera. Salicylates, as sodium salicylate, are used in rheumatic fever, rheumatic tonsilitis, and fevers. Concerning the therapeutic administration of acetylsalicylic acid, salicylic acid, and salicylates, Sollman in his "Manual of Pharmacology", Third Edition, 1926, Saunders, pp. 613–614, and 619, states, "For internal use, the free salicylic acid is too irritant." "When the dosage of salicylate is raised to the full therapeutic effect, there occurs usually a series of side actions resembling cinchonism. They consist of nausea and vomiting, ringing in the ears and deafness, vertigo and headache, mental dullness and confusion, diaphoresis, quickening pulse, and deepened respiration, rarely skin eruptions, albuminuria, impaired vision and delirium, the latter especially in alcoholic patients." "To be effective in acute rheumatism, large doses must be administered: 1 to 1.3 gm. should be given every hour until 'toxic' symptoms (tinnitus, nausea, et cetera) set in. The administration should then be stopped for twelve hours." Referring to the benefits from salicylate medication, he states, "These benefits last only so long as the patient is kept salicylated and relapses occur when this is discontinued." "Salicylates may have a slight and inconstant diuretic effect. Full doses, however, decrease the output of urine, partly by diaphoresis, partly by water retention. This is accompanied by evidences of renal irritation (slight albumin and casts) and diminished renal permeability (phthalein test and non-protein nitrogen of blood)." "Highly toxic doses produce anatomic parenchymatous lesions." Concerning acetylsalicylic acid medication, he states, "It produces some gastric irritation." "Acetylsalicylic acid is about one and one-half as toxic as sodium salicylate in man."

I have found that the administration of calcium acetylsalicylate, free from calcium salicylate, salicylic acid, and acetylsalicylic acid, does not produce these toxic side actions. For example, high calcium acetylsalicylate medication, free from calcium salicylate, salicylic acid, and acetylsalicylic acid is possible in cases of arthritis and rheumatic fever without the appearance of toxic side reactions. In cases of patients intolerant towards acetylsalicylic acid and salicylates, I have found that they can tolerate my calcium acetylsalicylate without difficulty and receive relief. Furthermore, in animals given massive does of calcium acetylsalicylate, free from calcium salicylate, salicylic acid, and acetylsalicylic acid, histologic sections of liver, kidney and gastric mucosa show no pathological lesions under conditions which give pathological lesions when the animals are given acetylsalicylic acid and salicylates.

I have found that the methods which are now in use for the production of calcium acetylsalicylate do not give products free from salicylate and stable towards storage and ordinary handling, the decomposition during storage and handling being such that free salicylic acid and calcium salicylate are formed. I have developed a process whereby calcium acetylsalicylate can be prepared free from calcium salicylate, salicylic acid and acetylsalicylic acid and in a condition which does not decompose during storage and ordinary handling to give these compounds.

The present invention resides in carrying out the reaction whereby calcium acetylsalicylate is formed in a solution having a pH within the range of 2 to 7 (two to seven), and preferably within the range of 4 to 7 (four to seven), and bringing the reactants together in such a way that the reaction takes place very quickly, with precipitation of the salt.

The following is an illustrative example utilizing the invention in the preparation of calcium acetylsalicylate: Fifty-two parts of anhydrous calcium acetate may be dissolved in 200 parts of water containing two parts of glacial acetic acid. Seventy-two parts of acetylsalicylic acid may be dissolved in 200 parts of methanol. The solution of acetylsalicylic acid is slowly added to the solution of calcium acetate with stirring, during a period of two to thirty minutes. Calcium acetylsalicylate separates as a fine white precipitate. The precipitate is separated from the mother liquor by any convenient process, such as filtration, centrifuging, et cetera, and may be washed with ether or a small amount of methanol to remove any unchanged acetylsalicylic acid. The precipitate can be dried by exposure to warm air at atmospheric pressure or at reduced pressure or by any other convenient process.

Acetylsalicylic acid, being in part an ester, is progressively saponified in solutions having a pH greater than 7, giving a salicylate, which has undesirable pharmacological properties, as hereinbefore pointed out. In prior processes for preparing calcium acetylsalicylate, acetylsalicylic acid is exposed to a basic solution for several hours. This accounts, in part, for the presence of salicylate in the products.

I have found that the decomposition of acetylsalicylic acid into salicylic acid takes place much more slowly at a pH below 7 than it does when the pH is above 7. A water solution of calcium acetate is slightly alkaline, so I prefer to make it slightly acid with acetic acid before combining it with acetylsalicylic acid. While the reaction can be carried out without the addition of acetic acid to the calcium acetate before combining with acetylsalicylic acid, I prefer to never expose acetylsalicylic acid to a solution having a pH greater than 7, even for a short period of time. During the reaction between calcium acetate and acetylsalicylic acid, acetic acid is formed, the concentration of which increases as the reaction proceeds. By using an excess of calcium acetate, the ionization of the newly formed acetic acid is depressed due to the effect of the common ion. The pH of the solution is approximately 5. I can control the pH of the solution by using the required excess of the acetate. Any calcium salicylate that is formed, and any acetylsalicylic acid that has not reacted, remains in the mother liquor.

My invention as it relates to the production of calcium acetylsalicylate is not limited to the use of any specific proportion of calcium acetate, acetic acid, and acetylsalicylic acid, since the use of other proportions leads also to the formation of calcium acetylsalicylate. Neither is my invention limited to the use of any specific proportions of solvent or solvents, since other proportions give similar results. While I prefer to use water as a solvent for calcium acetate and methanol as a solvent for acetylsalicylic acid, followed by their combination, water alone and methanol alone may be used. Also I have found that other organic solvents or combinations of organic solvents that will dissolve acetylsalicylic acid and are miscible with water, as ethanol and ether, acetone, methyl acetate, et cetera, can be used instead of methanol. My invention is not limited to any solvent or system of solvents. Also other water soluble calcium salts may be used instead of calcium acetate, provided precautions are taken to carry out the reaction in the pH range of 2 to 7. The essential feature of my invention is that the reaction is carried out in a solution having a pH within the range of 2 to 7.

I have further found that when calcium acetylsalicylate is precipitated rapidly, that a small amount of calcium acetate is carried down with it. The presence of this substance in the calcium acetylsalicylate renders it more stable towards storage and ordinary handling.

While I have described my invention as it relates to the preparation of calcium acetylsalicylate, free from calcium salicylate, salicylic acid, and acetylsalicylic acid, it is not to be construed that it is limited to the preparation only of calcium acetylsalicylate, as it is applicable to the preparation of all of the metal salts of acetylsalicylic acid. The term "metal salts of acetylsalicylic acid", includes the monovalent metal salts, lithium, sodium, and potassium acetylsalicylates; the bivalent metal salts, magnesium, calcium, and strontium acetylsalicylates; and the trivalent metal salts, aluminum and bismuth acetylsalicylates.

Some acids in addition to acetic acid whose water solutions have pH's in the range of 2 to 7, are citric, salicylic, benzoic, formic, butyric, lactic and succinic. When any of these is used in conjunction with its metal salts, the pH of the solution is maintained near the pK value of the acid because of the effect of the common ion.

I claim as my invention:

1. A process for preparing the metal salts of acetylsalicylic acid free from salicylic acid and acetylsalicylic acid, which comprises adjusting the pH value of a solution of a metal salt selected from the group consisting of the monovalent, bivalent and trivalent soluble metal salts of carboxylic acids to below 7 and above 2, combining the solution of the selected metal salt adjusted to said pH value range with acetylsalicylic acid, maintaining said resulting solution at a pH value within the range of 2 to 7, and recovering the precipitate.

2. A process for preparing the metal salts of acetylsalicylic acid free from salicylic acid and acetylsalicylic acid, which comprises adjusting the pH value of a solution of a metal salt selected from the group consisting of the monovalent, bivalent and trivalent soluble metal salts of carboxylic acids to below 7 and above 2, combining the solution of the selected metal salt adjusted to said pH value range with acetylsalicylic acid in a solution of an organic solvent miscible with water, maintaining said resulting solution at a pH value within the range of 2 to 7, and recovering the precipitate.

3. A process for preparing the metal salts of acetylsalicylic acid free from salicylic acid and acetylsalicylic acid, which comprises adjusting the pH value of a solution of a metal salt selected from the group consisting of the monovalent, bivalent and trivalent soluble metal salts of carboxylic acids to below 7 and above 4, combining the solution of the selected metal salt adjusted to said pH value range with acetylsalicylic acid in a solution of an organic solvent miscible with water, maintaining said resulting solution at a pH value within the range of 4 to 7, and recovering the precipitate.

4. A process for preparing calcium acetylsalicylate free from salicylic acid and acetylsalicylic acid, which comprises adjusting the pH value of a solution of calcium acetate to below 7 and above 4, combining said calcium acetate solution adjusted to said pH value range with acetylsalicylic acid, maintaining said resulting solution at a pH value within the range of 4 to 7, and recovering the precipitate.

5. A process for preparing calcium acetylsalicylate free from salicylic acid and acetylsalicylic acid, which comprises adjusting the pH value of a solution of a soluble calcium salt of carboxylic acids in water to a pH value range between 2 and 7, combining said solution adjusted to said pH value range with acetylsalicylic acid dissolved in an organic solvent miscible with water, maintaining said resulting solution at a pH value within the range of 2 to 7, and recovering the precipitate.

6. A process for preparing calcium acetylsalicylate free from salicylic acid and acetylsalicylic acid, which comprises adjusting the pH value of a solution of a soluble metal salt of carboxylic acids in water to a pH value range between 2 and 7, combining said solution adjusted to said pH value range with acetylsalicylic acid dissolved in an organic solvent miscible with water, maintaining said resulting solution at a pH value within the range of 2 to 7, and recovering the precipitate.

7. A process for preparing calcium acetylsalicylate free from salicylic acid and acetylsalicylic acid, which comprises combining calcium acetate with acetylsalicylic acid in a solution having a pH value within the range of 2 to 7, and recovering the precipitate.

8. A process for preparing the metal salts of acetylsalicylic acid free from salicylic acid and acetylsalicylic acid, which comprises combining a water-soluble metal salt selected from the group consisting of the monovalent, bivalent and trivalent metal salts of carboxylic acids with acetylsalicylic acid in a solution containing acetic acid, and recovering the precipitate.

9. A process for preparing calcium acetylsalicylate free from salicylic acid and acetylsalicylic acid which comprises combining calcium acetate with acetylsalicylic acid in a solution containing acetic acid, and recovering the precipitate.

10. A process for preparing the metal salts of acetylsalicylic acid free from salicylic acid and acetylsalicylic acid, which comprises combining the acetate of a metal with acetylsalicylic acid in a solution containing acetic acid, and recovering the precipitate.

11. A process for preparing calcium acetylsalicylate free from salicylic acid and acetylsalicylic acid, which comprises combining a solution of calcium acetate to which acetic acid has been added, with a solution of acetylsalicylic acid dissolved in an organic solvent miscible with water, and recovering the precipitate.

12. A new medicinal product consisting of a metal salt of acetylsalicylic acid resulting from reacting a metal salt of a carboxylic acid with acetylsalicylic acid while maintaining the pH value within the range of 2 to 7 during such reaction, and said product being substantially free from salicylic acid, metal salts of salicylic acid and from acetylsalicylic acid.

13. A new medicinal product consisting of calcium acetylsalicylate resulting from reacting a calcium salt of a carboxylic acid with acetylsalicylic acid while maintaining the pH value within the range of 2 to 7 during such reaction, and said product being substantially free from salicylic acid, metal salts of salicylic acid and from acetylsalicylic acid.

14. A new medicinal product consisting of calcium acetylsalicylate resulting from reacting calcium acetate with acetylsalicylic acid while maintaining the pH value within the range of 2 to 7 during such reaction, said product being substantially free from salicylic acid, metal salts of salicylic acid and from acetylsalicylic, acid, and containing a small amount of calcium acetate therein.

CLEMMY O. MILLER.